United States Patent [19]

Tanaka

[11] 4,336,552
[45] Jun. 22, 1982

[54] VERTICAL APERTURE CORRECTION CIRCUIT

[75] Inventor: Sadaaki Tanaka, Hadano, Japan

[73] Assignee: Sony Corporation, Tokyo, Japan

[21] Appl. No.: 217,419

[22] Filed: Dec. 17, 1980

[51] Int. Cl.³ .................. H04N 9/535; H04N 5/14
[52] U.S. Cl. ............................. 358/21 R; 358/162
[58] Field of Search ................. 358/21 R, 160, 162

[56] References Cited

U.S. PATENT DOCUMENTS 3,919,470  11/1975  Blom et al. .................. 358/162

Primary Examiner—Richard Murray
Attorney, Agent, or Firm—Lewis H. Eslinger; Alvin Sinderbrand

[57] ABSTRACT

A video signal, such as may be generated by a television camera, is subjected to a delay, and then combined with a relatively undelayed version thereof, the combined signal being supplied to a clipping circuit, which passes at least that portion thereof that exceeds a predetermined clipping level, and also to a slicing circuit, which passes at least that portion thereof that is less than the predetermined clipping level. A mixing circuit mixes the video signal with the outputs of the clipping and slicing circuits, thereby to provide a vertical aperture-corrected output video signal which is substantially free of periodic fluctuations that might be present in the amplitude of the original video signal. A preferred use of this vertical aperture correction circuit is with a color image pickup device of the type which generates a video signal having a superimposed periodic, fluctuating index signal thereon that produces a line-crawling effect in the ultimately produced video picture.

17 Claims, 25 Drawing Figures

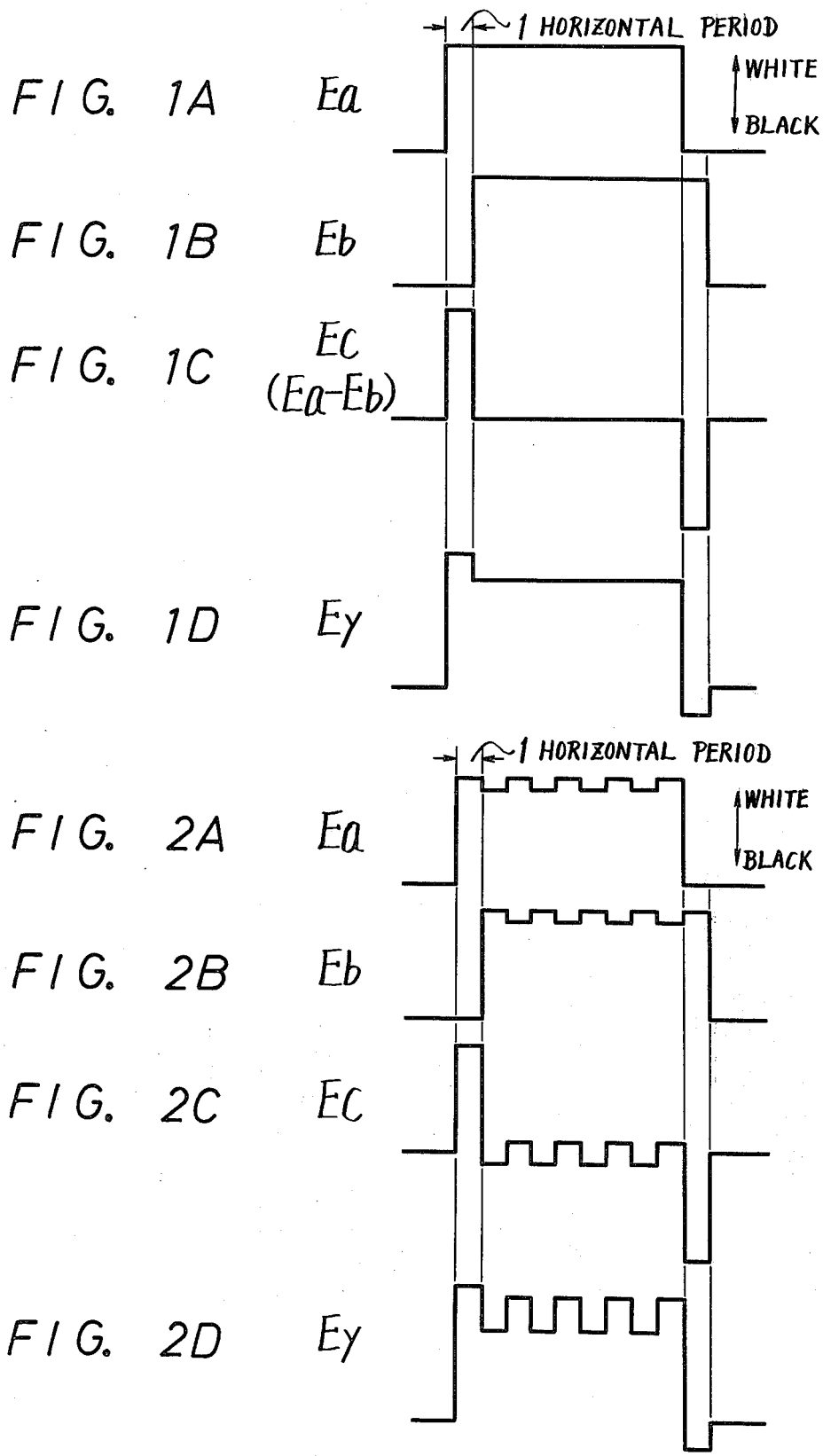

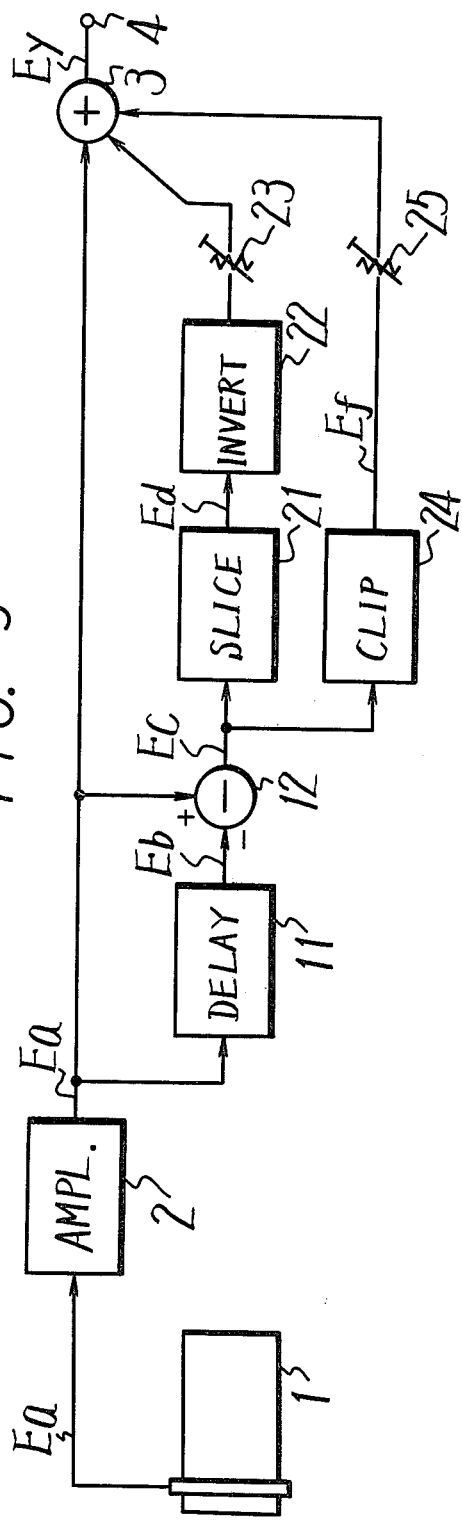
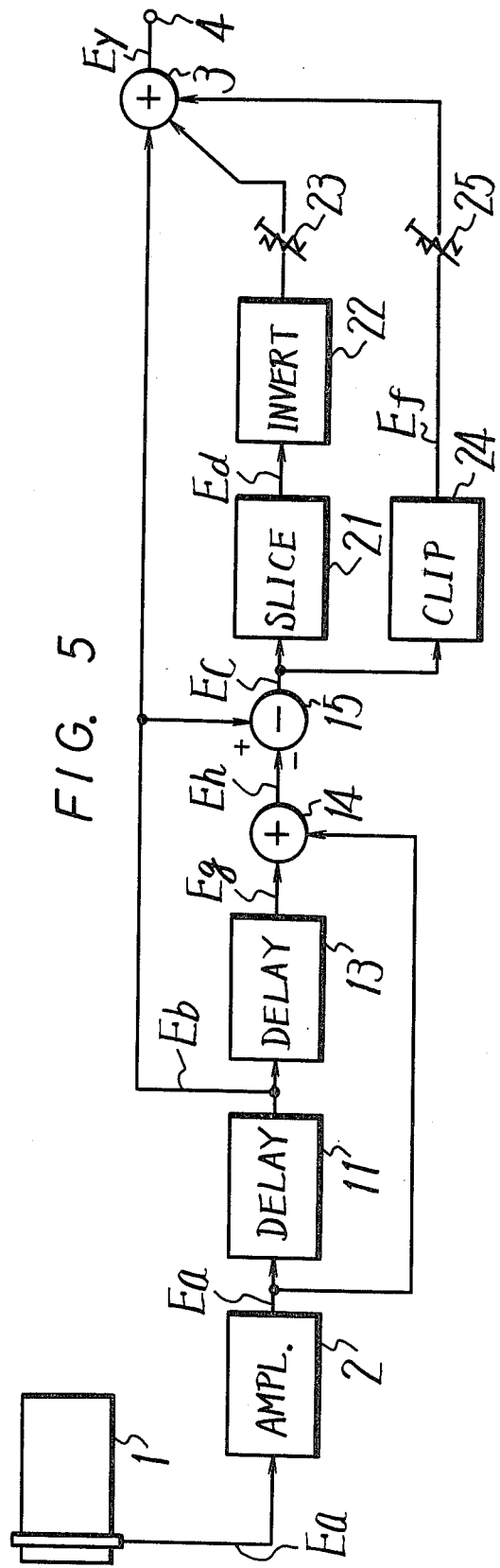

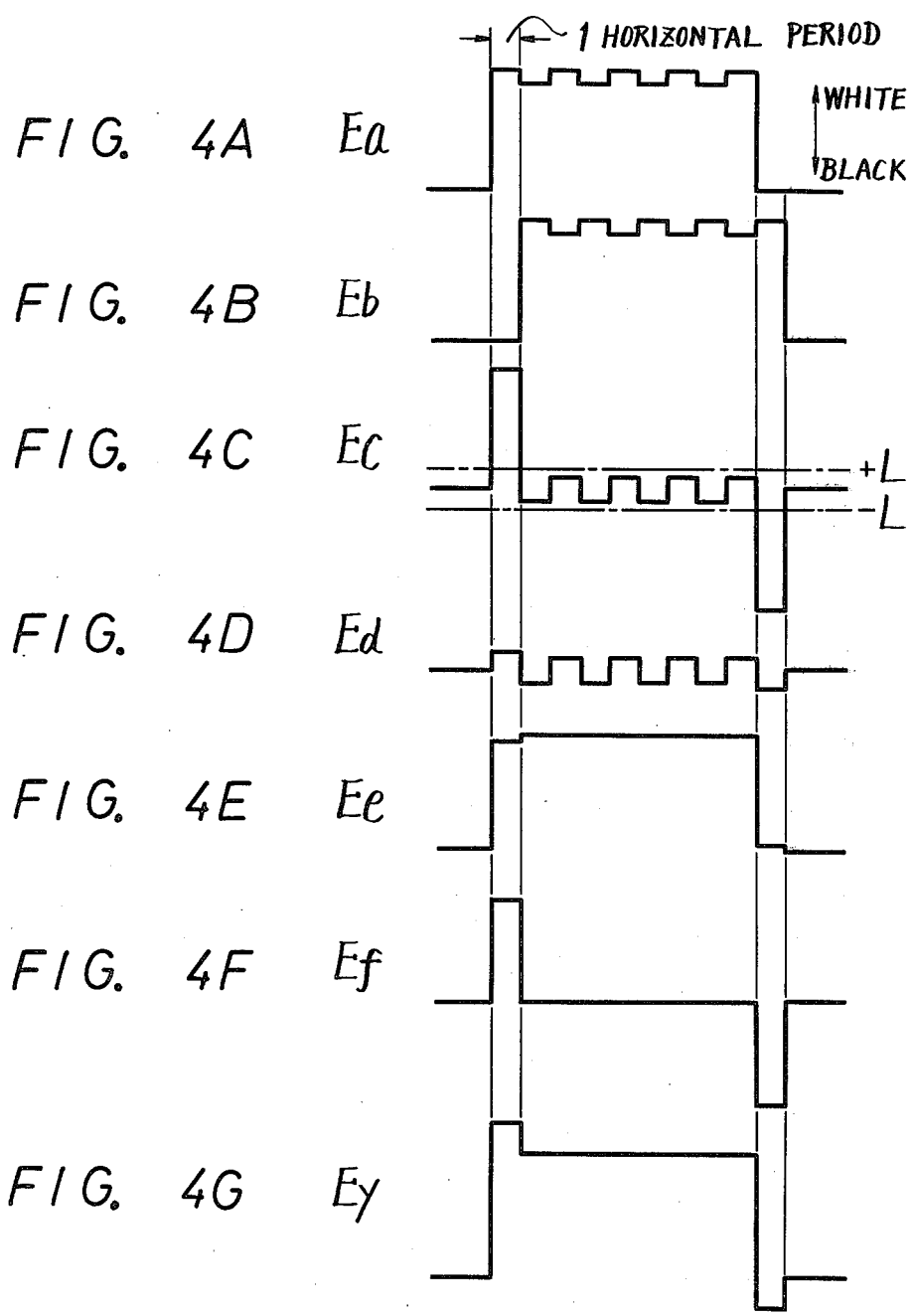

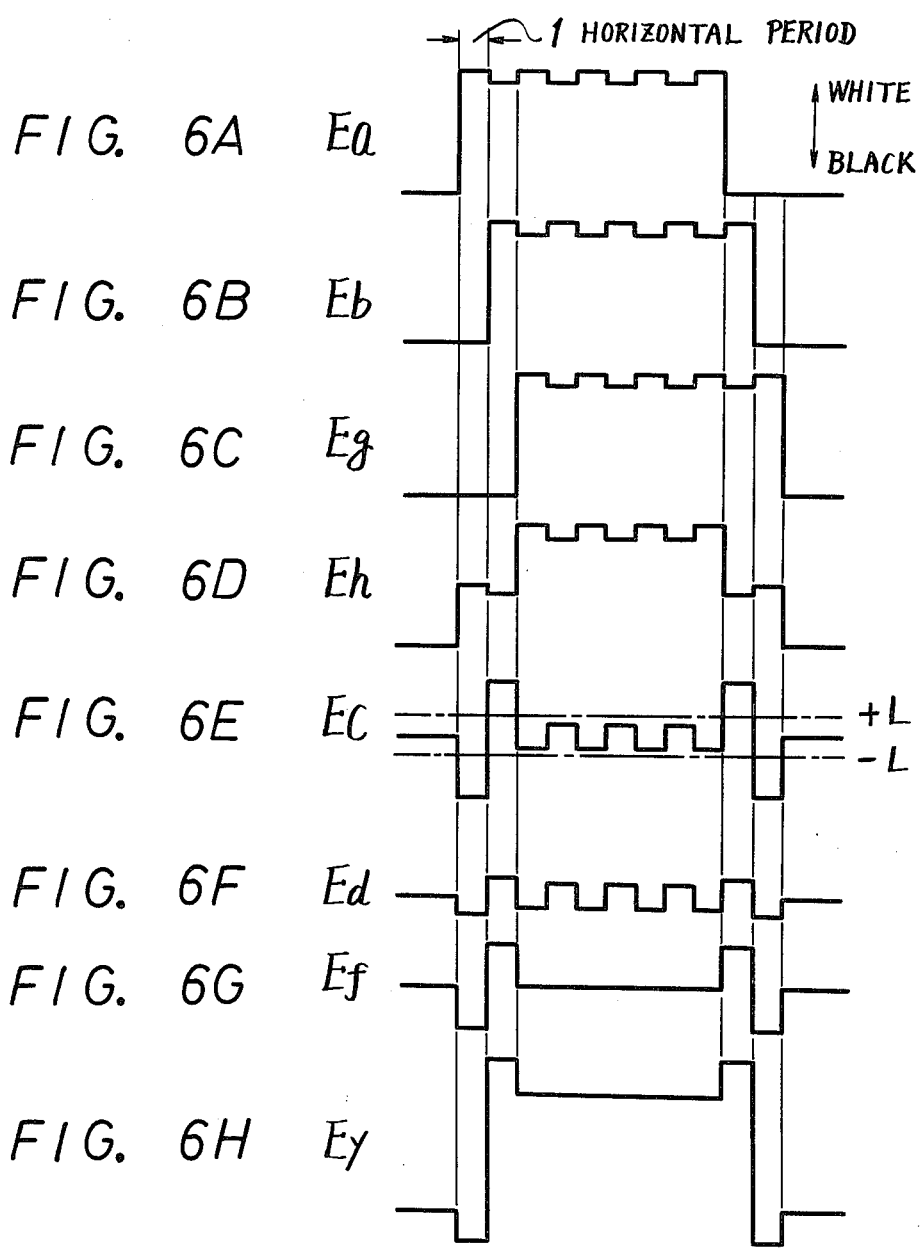

VERTICAL APERTURE CORRECTION CIRCUIT

BACKGROUND OF THE INVENTION

This invention relates to a vertical aperture correction circuit and, more particularly, to such a circuit which can be used in a color image pickup device to emphasize changes in the brightness level of the video picture from one line interval to the next while minimizing any line-crawling effect which might be inherent in the video signal.

In the color television picture which is derived from many color television cameras, the so-called edge sharpness, or sensitivity, of that picture is not as well-defined as in the picture derived from black-and-white television cameras. That is, a transition in brightness, or contrast, from one horizontal line interval to the next may not exhibit a desirable level of sharpness. Consequently, a viewer may not perceive accurate detail in the vertical direction. This loss of sharpness in the vertical direction, that is, in the direction perpendicular to the direction of line scanning, is analogous to aperture aberrations in an optical system.

Various proposals have been suggested for improving this sharpness. Such compensation or correction systems have been referred to generally as vertical aperture compensation systems. In one type of vertical aperture compensation system, the luminance signal, which may be the television signal generated by a black-and-white television camera or the luminance component of a composite color television signal generated by a color television camera, is delayed by one horizontal scanning, or line, interval, and the difference between the delayed and undelayed luminance signals then is derived. If the luminance level in successive line intervals is approximately the same, the aforementioned difference signal exhibits a relatively low amplitude. However, when the brightness level changes from one line interval to the next, this difference signal will be more pronounced. Consequently, the difference signal can be used as a relatively accurate indication of brightness changes in the vertical direction.

To emphasize such brightness level changes in the vertical direction, that is, to obtain vertical aperture compensation, a predetermined proportion of the difference signal is added to the original, i.e. undelayed, luminance signal. The summed signal thus is a vertical aperture-corrected luminance signal.

The aforementioned vertical aperture-correction technique is accompanied by undesired interference when used in a Trinicon color television camera. In the Trinicon camera, the target end of the pickup tube is provided with a set of index electrodes. These index electrodes are supplied with an index signal whose polarity is reversed at each horizontal scanning interval, thereby superimposing an alternating index signal onto the photoelectroconductive target. This index signal appears as a periodic fluctuating voltage level superimposed onto the luminance signal derived from the Trinicon camera. When the aforementioned vertical aperture-compensation technique is used with this luminance signal, the superimposed periodic, fluctuating level is emphasized. Therefore, in addition to providing an indication of brightness level changes from one line interval to the next, the vertical aperture-compensated luminance signal is provided with an emphasized, superimposed periodic fluctuating level which results in a line-crawling effect in the video picture ultimately reproduced therefrom.

In addition to this periodic fluctuating level derived from the index signal, another AC component may be introduced into the luminance signal due to the operation of the typical DC-DC converter that is used with the television camera. This DC-DC converter is provided in the television camera for the purpose of generating various DC control voltages from a single supplied DC voltage. Generally, during normal operation thereof, the DC-DC converter is supplied with relatively large amounts of power, and this has been known to introduce an AC component into the relatively low-level luminance signal. Such an AC component may appear as noise, typically a striped pattern, on the reproduced television picture. To minimize this noise, the driving frequency of the DC-DC converter may be synchronized to one-half the horizontal scanning frequency. However, this is the very same frequency of the index signal that results in a superimposed periodic, fluctuating level on the luminance signal. Thus, when the vertical aperture-compensation technique discussed above is used, the AC component derived from the DC-DC converter is manifested in the aforementioned line-crawling effect.

One technique which has been proposed for eliminating the line-crawling effect due to the superimposed index signal and, presumably, also will eliminate the line-crawling effect due to the AC component derived from the DC-DC converter, is disclosed in U.S. Pat. No. 4,160,265. According to this patent, the difference between the delayed and undelayed luminance signal, which is indicative of line-to-line brightness-level changes and which also emphasizes the periodic fluctuations superimposed onto the luminance signal, is squared, or multiplied by itself, and the squared difference signal then is mixed with the sum of the delayed and undelayed video signals. The output of the mixing circuit is a vertical aperture-corrected luminance signal that is substantially free of undesired periodic level fluctuations which may be due to the superimposed index signal of the Trinicon camera or may be due to the AC component produced from the DC-DC converter.

In accordance with the present invention, vertical aperture-correction is attained in the absence of any line-crawling effect, and the complexity of the correction circuit due to the aforementioned squaring circuit is reduced.

OBJECTS OF THE INVENTION

Therefore, it is an object of the present invention to provide an improved vertical aperture-correction circuit for use with a color television camera which is substantially free of the aforementioned line-crawling effect.

Another object of this invention is to provide a video signal processing circuit which operates upon a video signal to provide vertical aperture-correction therefor while substantially eliminating or minimizing periodic fluctuations that might be present in the amplitude of that video signal.

A further object of this invention is to provide a vertical aperture-correction circuit for use with a color image pickup device of the type which generates a video signal having a superimposed periodic, fluctuating index signal thereon, which vertical aperture-correction circuit cancels or eliminates "line crawling"

which may be caused by such superimposed fluctuating signal.

An additional object of this invention is to provide an improved, relatively simple and inexpensive vertical aperture-correction circuit which is particularly useful with a color image pickup device of the type which generates a video signal having a superimposed periodic, fluctuating index signal thereon.

Various other objects, advantages and features of the present invention will become readily apparent from the ensuing detailed description, and the novel features will be particularly pointed out in the appended claims.

SUMMARY OF THE INVENTION

In accordance with this invention, a video signal processing circuit is comprised of a delay circuit for imparting a relative delay to a video signal supplied thereto, and a combining circuit for combining the relatively delayed video signal with a relatively undelayed version thereof to produce a combined signal. A clipping circuit passes at least that portion of the combined signal which exceeds a predetermined clipping level, and a slicing circuit passes at least that portion of the combined signal which is less than the predetermined clipping level. A mixing circuit mixes the video signal with the respective portions passed by the clipping and slicing circuits, thereby to provide a corrected output video signal substantially free of periodic fluctuations that might be present in the amplitude of the supplied video signal. In a preferred application, the video signal is supplied by a color image pickup device of the type which superimposes a periodic, fluctuating index signal on the video signal, this superimposed, fluctuating signal having a line-crawling effect on the video picture ultimately reproduced from the video signal. The resultant, corrected video signal has its line-to-line brightness level changes emphasized.

BRIEF DESCRIPTION OF THE DRAWINGS

The following detailed description, given by way of example, will best be understood in conjunction with the accompanying drawings in which:

FIGS. 1A–1D are waveform diagrams which are useful in understanding the operation of typical vertical aperture-correction circuits;

FIGS. 2A–2D are waveform diagrams which are useful in understanding the operation of a typical vertical aperture-correction circuit with a color image pickup device of the type which superimposes a periodic, fluctuating index signal on the video signal;

FIG. 3 is a block diagram of one embodiment of the present invention;

FIGS. 4A–4G are waveform diagrams which are useful in understanding the operation of the embodiment shown in FIG. 3;

FIG. 5 is a block diagram of another embodiment of the present invention; and

FIGS. 6A–6H are waveform diagrams which are useful in understanding the operation of the embodiment shown in FIG. 5.

DETAILED DESCRIPTION OF CERTAIN PREFERRED EMBODIMENTS

Referring now to the drawings, the waveform diagrams illustrated in FIGS. 1A–1D are typical of the waveforms which are generated in a vertical aperture-correction circuit by which vertical sharpness in the video picture is improved. FIG. 1A represents the luminance signal $E_a$ whose amplitude is a function of the brightness of the video scene. For the purpose of simplification, luminance signal $E_a$ is illustrated as having two transitions in a constant brightness level. FIG. 1B represents a delayed version $E_b$ of the luminance signal. That is, delayed luminance signal $E_b$ is delayed by one horizontal scanning, or line, interval from luminance signal $E_a$. The difference between the undelayed luminance signal $E_a$ and the delayed luminance signal $E_b$ is illustrated as difference signal $E_c$ in FIG. 1C. It is appreciated that the waveform shown in FIG. 1C emphasizes brightness-level changes in the luminance signal from one line interval to the next. A predetermined proportion of difference signal $E_c$ (FIG. 1C) is added to the original, undelayed video signal $E_a$, the summed signals being illustrated in FIG. 1D as aperture-corrected luminance signal $E_y$. It may be appreciated that difference signal $E_c$ may be supplied to a suitable adding circuit by a voltage-divider circuit which divides the difference signal by a predetermined dividing ratio $\alpha$. Hence, luminance signal $E_y$ may be represented as $E_y = E_a + \alpha E_c$.

The waveforms illustrated in FIGS. 2A–2D represent the manner in which a typical vertical aperture-correction circuit operates with a Trinicon color television camera. The Trinicon camera is described in U.S. Pat. No. 3,784,737 and includes, at its target end, a set of alternating electrodes which are supplied with different DC levels that are reversed in synchronism with the horizontal scanning rate. Because of this, a fluctuating signal is induced on the photoconductive target which, in turn, superimposes onto the luminance signal a fluctuating index signal having a frequency equal to one-half the horizontal scanning rate. This luminance signal with the superimposed periodic fluctuating level is illustrated as luminance signal $E_a$ in FIG. 2A. As before, this luminance signal is delayed in the typical vertical aperture-correction circuit by one horizontal scanning period, the delayed luminance signal being shown as delayed signal $E_b$ in FIG. 2B. The delayed signal $E_b$ is subtracted from the original, undelayed luminance signal $E_a$, resulting in the difference signal $E_c$ shown in FIG. 2C. It may be appreciated that difference signal $E_c$ is provided with emphasized fluctuating levels. When this difference signal $E_c$ is added to the original luminance signal $E_a$, the resultant corrected luminance signal $E_y$ appears as shown in FIG. 2D. This corrected luminance signal has superimposed thereon a periodic fluctuating signal which is derived from the index signal that had been superimposed onto the photoconductive target of the color camera. This superimposed fluctuating signal has its level changed over at each successive horizontal scanning interval, thereby resulting in the "line crawl" effect in the video picture which ultimately is reproduced therefrom. That is, the periodic change in the brightness level of the luminance signal $E_y$ (FIG. 2D) is readily perceived as a line crawl.

The foregoing disadvantages, particularly the superimposed fluctuating level on the vertical aperture-corrected luminance signal, are avoided by the present invention, one embodiment of which is illustrated in FIG. 3. in this Figure, a video signal processing circuit is coupled to a Trinicon-type color video camera 1, the video signal processing circuit serving to provide a corrected output video signal substantially free of periodic fluctuations that are present in the amplitude of the video signal derived from camera 1. It may be appreciated that camera 1 may be constructed as a color image pickup device in accordance with the disclosure of aforementioned U.S. Pat. No. 3,784,737. As is apparent from that disclosure, and as is also described in U.S. Pat. No. 4,160,265, a luminance signal $E_a$ may be derived from the composite color video signal produced by color camera 1. This luminance signal $E_a$ is amplified by a suitable video amplifier 2 and then supplied to the video signal processing circuit which is the subject of the present invention.

The video signal processing circuit functions as a vertical aperture-correction circuit and is comprised of a delay circuit 11, a subtracting circuit 12, a slicing circuit 21, a clipping circuit 24 and a mixing circuit 3. Delay circuit 11 may comprise a conventional delay circuit adapted to impart a delay equal to one horizontal scanning interval to the video signal supplied thereto. Delay circuit 11 is coupled to the output of amplifier 2 and receives luminance signal $E_a$. The output of this delay circuit is coupled to subtracting circuit 12 wherein the delayed video signal $E_b$ is subtracted from the original, undelayed luminance signal $E_a$. The output of subtracting circuit 12 is coupled in common to slicing circuit 21 and to clipping circuit 24. The slicing circuit is supplied with predetermined threshold levels by suitable means (not shown), and is adapted to pass only those portions of the video signal supplied thereto which lie between the threshold levels. Preferably, and as will be described in greater detail below, these threshold levels are equal and opposite levels $+L$ and $-L$, respectively, disposed on opposite sides of the mean level of the difference signal produced by subtracting circuit 12. As an alternative, if the output of subtracting circuit 12 is a positive (or negative) signal, slicing circuit 21 may be supplied with a positive (or negative) threshold level and may be adapted to pass only the positive (or negative) portions of the output of subtracting circuit 12 which are less than the threshold level. The output of slicing circuit 21, that is, that portion of the difference signal supplied thereto by subtracting circuit 12, which is less than the respective threshold levels supplied thereto, is inverted by an inverter circuit 22 and supplied to mixing circuit 3 via an amplitude adjustment circuit 23. This amplitude adjustment circuit is illustrated as an adjustable resistor, such as a potentiometer, and is settable to supply to mixing circuit 3 a predetermined proportion of the inverted output of slicing circuit 21. By suitably adjusting amplitude adjustment circuit 23, this proportion $\beta$ may be varied, as desired.

Clipping circuit 24 is adapted to pass that portion of difference signal $E_c$ which exceeds a threshold level. If threshold levels $+L$ and $-L$ are supplied to slicing circuit 21, these same threshold levels may be supplied to clipping circuit 24, whereupon the clipping circuit passes those portions of difference signal $E_c$ which exceed threshold level $+L$ and which exceed threshold level $-L$. An amplitude adjustment circuit 25, which may be similar to amplitude adjustment circuit 23, supplies the output of clipping circuit 24 to mixing circuit 3. It is appreciated that amplitude adjustment circuit 25 serves to adjust the proportion of the output of the clipping circuit that is supplied to the mixing circuit.

Mixing circuit 3 is supplied with luminance signal $E_a$, the desired proportion of the inverted output of slicing circuit 21, and the desired proportion of the output of clipping circuit 24. Mixing circuit 3 may function as a summing circuit so as to sum the respective signals supplied thereto. The output of mixing circuit 3 is supplied to an output terminal as a vertical aperture-corrected luminance signal $E_y$.

It is appreciated that the function of inverting circuit 22 is to subtract the output of slicing circuit 21 from the summation of video signal $E_a$ and the output of clipping circuit 24. If desired, inverting circuit 22 may be omitted, and mixing circuit 3 may be comprised of respective circuit devices which carry out the aforementioned summing and subtracting operations. For example, luminance signal $E_a$ may be summed with the output of clipping circuit 24 in an adding circuit, and the output of slicing circuit 21 then may be subtracted from the summed signals in an additional subtracting circuit.

The manner of operation of the vertical aperture-correction circuit shown in FIG. 3 now will be described with reference to the waveforms shown in FIGS. 4A-4G. Luminance signal $E_a$, derived from video camera 1, is illustrated in FIG. 4A. The periodic fluctuating index signal is shown to be superimposed onto the brightness level of the luminance signal. FIG. 4B illustrates the luminance signal delayed by one horizontal scanning interval. This delayed luminance signal $E_b$ is derived at the output of delay circuit 11.

Subtracting circuit 12 subtracts the delayed luminance signal $E_b$ from the undelayed version of the luminance signal $E_a$ to produce difference signal $E_c$ shown in FIG. 4C. It is seen that this difference signal $E_c$ emphasizes the changes in brightness of the luminance signal from one horizontal line interval to the next, and also emphasizes the periodic fluctuating levels in the luminance signal. This difference signal $E_c$, having the emphasized brightness changes and periodic fluctuating levels, is supplied to slicing circuit 21 and also to clipping circuit 24.

FIG. 4C also illustrates threshold levels $+L$ and $-L$, these threshold levels being represented by the broken lines, and being supplied as threshold reference voltage levels to the slicing and clipping circuits. Threshold levels $+L$ and $-L$ are, for example, equal and opposite threshold levels disposed on opposite sides of the mean level of difference signal $E_c$. Slicing circuit 21 serves to pass that portion of difference signal $E_c$ which lies between threshold levels $+L$ and $-L$. This portion of the difference signal that is passed by slicing circuit 21 is illustrated as signal $E_d$ in FIG. 4D. This passed portion $E_d$ is inverted by inverting circuit 22, level-adjusted by amplitude adjustment circuit 23, and then summed in mixing circuit 3 with luminance signal $E_a$. This has the equivalent effect of subtracting the output $E_d$ of slicing circuit 21 (suitably amplitude-adjusted) from the luminance signal. FIG. 4E represents this operation, and illustrates a signal $E_e$ which would be produced if the output $E_d$ from slicing circuit 21 is subtracted from luminance signal $E_a$. That is, FIG. 4E illustrates a waveform which is formed by the operation $E_e = E_a - E_d$. It may be appreciated that the proportion of the output $E_d$ from slicing circuit 21 that is supplied to mixing circuit 3 is determined by amplitude adjustment circuit 23 such that the periodic fluctuations shown in FIG. 4D are attenuated so as to be substantially equal to the periodic fluctuations that are superimposed onto luminance signal $E_a$ (FIG. 4A). Hence, and as shown in FIG. 4E, the signal $E_e$ which would be produced by subtracting the amplitude-adjusted output $E_d$ of slicing circuit 21 from luminance signal $E_a$ exhibits substantially no periodic amplitude fluctuations.

Clipping circuit 24 also may be supplied with threshold levels $+L$ and $-L$. The clipping circuit functions to pass the positive portion of difference signal $E_c$ which exceeds threshold level $+L$, and also passes the negative portion of difference signal $E_c$ which exceeds threshold level $-L$. The output $E_f$ of clipping circuit 24 is illustrated in FIG. 4F. This output $E_f$, after being suitably amplitude adjusted by amplitude adjustment circuit 25 is added to the signal $E_e$ (FIG. 4E). The summed signal $E_y = E_e + E_f$ is shown in FIG. 4G and is supplied to output terminal 4 by mixing circuit 3. Stated otherwise, this corrected luminance signal $E_y$ produced by mixing circuit 3 may be mathematically represented as $E_y = E_a - E_d + E_f$. It is seen that this corrected luminance signal is provided with emphasized brightness level changes, that is, changes in the brigtness level from one line interval to the next are emphasized, but is substantially free of the periodic amplitude fluctuations inherent in luminance signal $E_a$. A comparison between the waveforms shown in FIGS. 4G and 2D illustrates the improvement obtained by the present invention. Thus, aperture-corrected luminance signal $E_y$ (FIG. 4G) does not give rise to the undesired line crawling effect in the video picture ultimately reproduced therefrom.

In the present invention, it is seen that difference signal $E_c$ (FIG. 4C) is further processed before being mixed with luminance signal $E_a$. But for this further processing, the corrected luminance signal would appear as shown in FIG. 2D. That is, if difference signal $E_c$ is used directly as a vertical aperture-correction signal, the "corrected" luminance signal would have brightness level changes emphasized, and also would contain enforced fluctuating levels, as shown in FIG. 2D. However, in accordance with the embodiment shown in FIG. 3, the vertical aperture-corrected luminance signal $E_y$ (FIG. 4G) more closely resembles the corrected luminance signal shown in FIG. 1D, this latter signal being derived from a color television camera which does not superimpose a periodic, fluctuating level onto the video signal.

Slicing circuit 21 may be supplied with a single threshold level $+L$ and may be operative to pass the absolute value of difference signal $E_c$ which is less than this threshold level. Likewise, clipping circuit 24 may be supplied with a single threshold level $+L$ and may be operative to pass the absolute value of difference signal $E_c$ which exceeds this threshold level.

The respective settings of amplitude adjustment circuits 23 and 25 are assumed to differ from each other. Amplitude adjustment circuit 23 serves to attenuate the level of the signal supplied thereto by a factor $\beta$ and amplitude adjustment circuit 25 serves to attenuate the signal supplied thereto by the factor $\gamma$. The attenuating ratio $\beta$ serves to eliminate the fluctuating level of luminance level $E_a$; and the attenuating ratio $\gamma$ serves to provide desired emphasis of brightness-level changes.

The embodiment shown in FIG. 3 is a relatively simplified version of the present invention. A more practical version is illustrated in FIG. 5, wherein like reference numerals are used to identify like component parts. The embodiment of FIG. 5 differs from that of FIG. 3 in that an additional delay circuit 13 is connected in cascade with delay circuit 11, the output of delay circuit 13 being summed in a summing circuit 14 with luminance signal $E_a$. The summed signal $E_h$ produced by summing circuit 14 is subtracted in a subtracting circuit 15 from the delayed luminance signal $E_b$ produced at the output of delay circuit 11. In the embodiment of FIG. 5, delay circuits 11 and 13 each impart a delay equal to one horizontal line interval. If desired, luminance signal $E_a$ may be supplied to subtracting circuit 15 by delay circuit 11, and this luminance signal may be supplied directly to summing circuit 14, as illustrated, and also to this summing circuit via another delay circuit (not shown) which serves to impart a delay equal to two horizontal line intervals. In this alternative arrangement, delay circuit 13 is omitted, and the output of delay circuit 11 is connected only to subtracting circuit 15 (and also to mixing circuit 3).

In operation, luminance signal $E_a$ appears as shown in FIG. 6A. This luminance signal is subjected to a first delay, equal to one horizontal line interval, by delay circuit 11, resulting in the delayed luminance signal $E_b$ shown in FIG. 6B. This delayed video signal $E_b$ is further delayed by another horizontal line interval in delay circuit 13, resulting in a 2H delayed luminance signal $E_g$, shown in FIG. 6C. As mentioned above, this 2H delay may, alternatively, be produced by a single delay circuit which imparts a time delay equal to two horizontal line intervals to luminance signal $E_e$.

2H delayed luminance signal $E_g$ is summed with undelayed luminance signal $E_a$ in summing circuit 14, resulting in the summed signal $E_h$ shown in FIG. 6B. Preferably, delayed signal $E_g$ is attenuated by a factor of $\frac{1}{2}$, and undelayed luminance signal $E_a$ likewise is attenuated by the factor of $\frac{1}{2}$. Hence, summed signal $E_h$ shown in FIG. 6D may be represented as $E_h = \frac{1}{2}(E_a + E_g)$.

Summed signal $E_h$ (FIG. 6D) is subtracted from 1H delayed luminance signal $E_b$ in subtracting circuit 15, resulting in the difference signal $E_c$, shown in FIG. 6E. This difference signal $E_c$ may be represented as $E_c = E_b - E_h$. It is appreciated that this difference signal $E_c$ emphasizes the brightness-level changes in the luminance signal from one line interval to the next and, moreover, emphasizes the periodic fluctuating level which has been superimposed onto luminance signal $E_a$.

As before, this difference signal $E_c$ is supplied to slicing circuit 21, which slicing circuit passes that portion of difference signal $E_c$ which lies between threshold levels $+L$ and $-L$. The signal $E_d$ passed by slicing circuit 21 is shown in FIG. 6F. This passed signal $E_d$ is inverted by inverting circuit 21, amplitude adjusted by amplitude adjustment circuit 23, and then summed with delayed luminance signal $E_b$ in mixing circuit 3.

Difference signal $E_c$ is supplied to clipping circuit 24 which passes that portion of the difference signal that exceeds the threshold levels $+L$ and $-L$. The output $E_f$ of clipping circuit 24 is illustrated in FIG. 6G. This passed signal $E_f$ is amplitude adjusted by amplitude adjustment circuit 25, and then summed in mixing circuit 3 with delayed luminance signal $E_b$ and amplitude-adjusted, inverted signal $E_d$. The output of mixing circuit 3 appears as a vertical aperture-corrected luminance signal $E_y$, as shown in FIG. 6H. This corrected luminance signal has the brightness-level changes emphasized therein and, moreover, the fluctuating level that had been superimposed onto the original luminance signal $E_a$ (FIG. 6A) is eliminated. Thus, vertical aperture correction is attained in the absence of a line crawling component.

It is appreciated that, in FIG. 3, delay circuit 11 and subtracting circuit 12 function as a combining circuit for combining the relatively delayed luminance signal $E_b$ and undelayed luminance signal $E_a$. Likewise, in FIG. 5, delay circuits 11 and 13, together with summing circuit 14 and subtracting circuit 15 function as a combining circuit for combining undelayed luminance signal $E_a$ with delayed luminance signal $E_g$, these combined signals being further combined with delayed luminance signal $E_b$. In both embodiments, the combining circuits serve to emphasize changes in the brightness of the luminance signal from one horizontal line interval to the next, and also serve to emphasize the periodic fluctuating levels which had been superimposed onto the luminance signal by the inherent operation of camera 1.

While the present invention has been particularly shown and described with reference to certain preferred embodiments, it should be readily apparent to those of ordinary skill in the art that various changes and modifications in form and details may be made without departing from the spirit and scope of the invention. It is intended that the appended claims be interpreted as including such changes and modifications.

What is claimed is:

1. A video signal processing circuit comprising means for supplying a video signal; delay means for imparting a relative delay to the supplied video signal; combining means for combining the relatively delayed video signal with a relatively undelayed version of the video signal to produce a combined signal; clipping means coupled to said combining means for passing at least that portion of said combined signal which exceeds a predetermined clipping level; slicing means coupled to said combining means for passing at least that portion of said combined signal which is less than said predetermined clipping level; and mixing means for mixing the video signal with the respective portions passed by said clipping means and said slicing means, thereby to provide a corrected output video signal substantially free of periodic fluctuations that might be present in the amplitude of said supplied video signal.

2. The circuit of claim 1 wherein said delay means imparts a delay of at least one horizontal scanning interval.

3. The circuit of claim 1 wherein said mixing means comprises summing means for summing the respective signals supplied thereto; and further comprising means for inverting the portion supplied from said slicing means to said summing means; whereby the video signal, the portion of said combined signal passed by said clipping means, and the inverted portion of said combined signal passed by said slicing means are summed.

4. The circuit of claim 1 wherein said mixing means comprises means for adding the portion passed by said clipping means to the video signal and for subtracting therefrom the portion passed by said slicing means.

5. The circuit of claim 1 wherein said combining means comprises subtracting means for producing said combined signal as a function of the difference between said supplied and relatively delayed video signals.

6. The circuit of claim 5 wherein said delay means imparts a delay equal to one horizontal scanning interval.

7. The circuit of claim 1 wherein said combining means comprises further delay means for producing a further delayed video signal; summing means for summing said further delayed and supplied video signals to produce a sum signal; and subtracting means for producing said combined signal as a function of the difference between said delayed video and sum signals.

8. The circuit of claim 7 wherein said further delay means is connected in cascade with said delay means, and each imparts a delay equal to one horizontal scanning interval.

9. The circuit of claim 1, further comprising for adjusting the amplitude of the portion of said combined signal that is passed by at least said clipping means.

10. The circuit of claim 1 wherein said means for supplying a video signal comprises a color image pickup device for generating said video signal and having means for superimposing a periodic, fluctuating index signal on said generated video signal.

11. In a color image pickup device of the type which generates a video signal having a superimposed periodic, fluctuating index signal thereon resulting in periodic fluctuating levels of said video signal having a line-crawling effect on the video picture ultimately reproduced from said video signal, a vertical aperture correction circuit comprising delay means for imparting a relative delay to said video signal; means responsive to relatively delayed and undelayed video signals for emphasizing changes in brightness of the video signal from one horizontal scanning interval to the next and for emphasizing said periodic fluctuating levels; clipping means for passing those portions of the output of said means for emphasizing which exceed predetermined clipping levels; slicing means for passing that portion of said output of said means for emphasizing which lies between said predetermined clipping levels; and mixing means for mixing the video signal and the portions passed by said clipping and slicing means, whereby the portions passed by said slicing means are subtracted from the sum of the video signal and the portions passed by said clipping means.

12. The circuit of claim 11 wherein said predetermined clipping levels are respectively above and below the mean level of said emphasized periodic fluctuating levels.

13. The circuit of claim 11 wherein said delay means imparts a delay equal to one horizontal scanning interval; and said means for emphasizing comprises subtracting means for producing an output which is a function of the difference between the video signal delayed by one horizontal scanning interval and the undelayed video signal.

14. The circuit of claim 13 wherein said mixing means comprises inverter means coupled to said slicing means for inverting the portions passed by said slicing means, and adding means coupled to said inverter means and said clipping means and also coupled to receive the undelayed video signal for adding the inverted portions passed by said slicing means, the portions passed by said clipping means, and said undelayed video signal.

15. The circuit of claim 11 wherein said delay means imparts a delay equal to one horizontal scanning interval; and said means for emphasizing comprises additional delay means to impart an overall delay to said video signal equal to two horizontal scanning intervals, summing means for summing the video signal delayed by two horizontal scanning intervals and the undelayed video signal, and subtracting means for producing an output which is a function of the difference between the video signal delayed by one horizontal scanning interval and the output produced by said summing means.

16. The circuit of claim 15 wherein said mixing means comprises inverter means coupled to said slicing means for inverting the portions passed by said slicing means, and adding means coupled to said delay means, said inverter means and said clipping means for adding the video signal delayed by one horizontal scanning interval, the inverted portions passed by said slicing means and the portions passed by said clipping means.

17. The circuit of claim 11, further comprising level adjusting means for selectively adjusting the ratio of the amplitudes of the signals supplied to said mixing means.

* * * * *